Nov. 19, 1963 J. R. DAY 3,111,633

FREQUENCY MODULATED GENERATORS

Filed Oct. 3, 1960

INVENTOR
JAMES R. DAY
BY
Moses, Nolte, & Nolte
ATTORNEYS

United States Patent Office 3,111,633
Patented Nov. 19, 1963

3,111,633

FREQUENCY MODULATED GENERATORS

James R. Day, Peconic, N.Y.; Louise O. Day, executrix of said James R. Day, deceased, assignor to Radio Engineering Laboratories, Inc., Long Island City, N.Y., a corporation of New York Filed Oct. 3, 1960, Ser. No. 59,929
3 Claims. (Cl. 332—23)

Figures 1, 2:
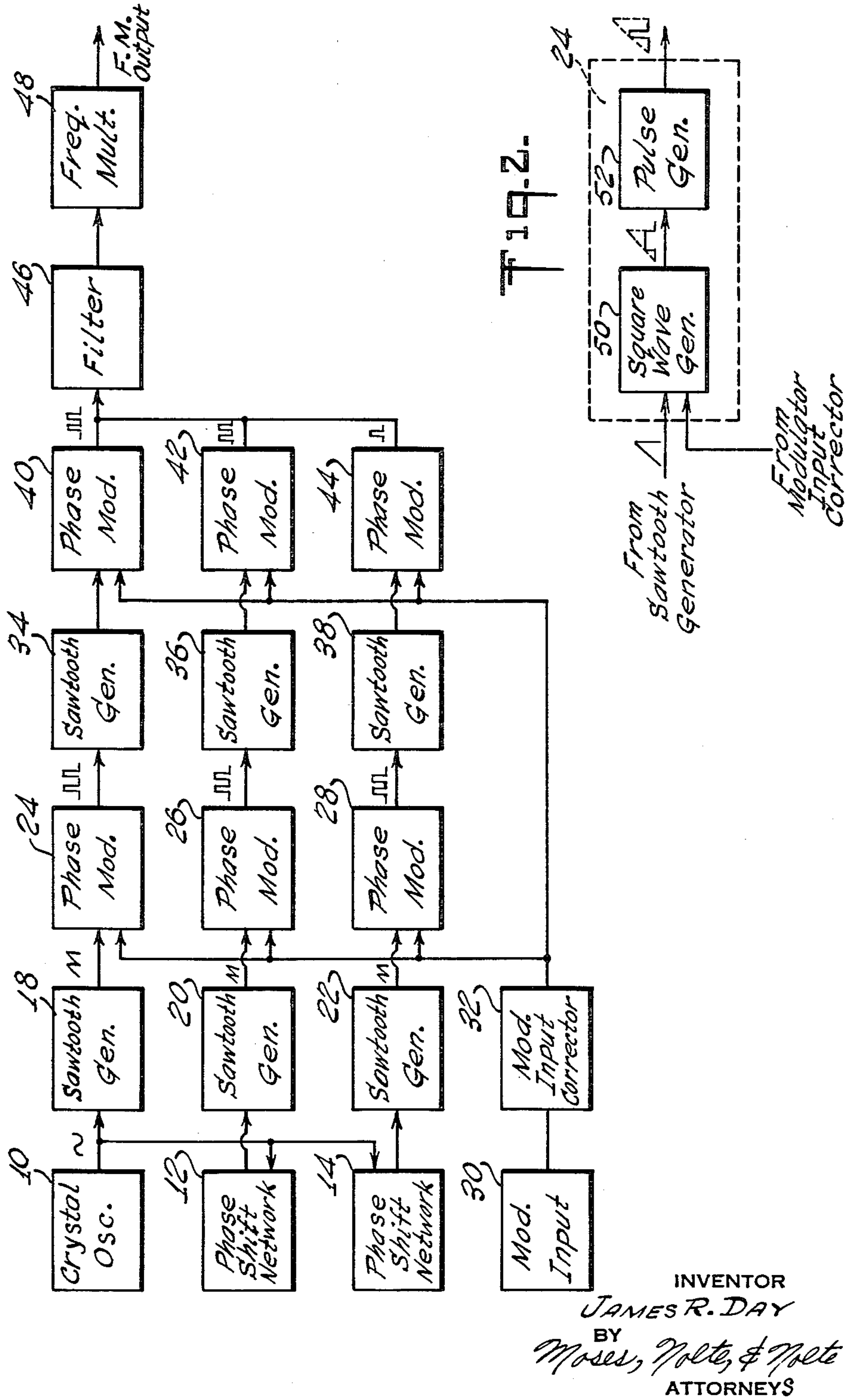

This invention relates to the generation of wide swing frequency modulated signals and particularly to the generation of such signals by improved means which employ the phase shift method utilizing a base wave of accurately controlled sawtooth wave shape.

The present invention contemplates an improvement of the system disclosed in my Patent No. 2,566,826. In that patent, there is described the general operation of a frequency modulator, to which the name "Serrasoid" has been applied, wherein a passive sawtooth wave generator is phase modulated by a modulation input circuit which results in a plurality of pulses whose phases are shifted along a time base axis. In line 21 to line 63 of colum 9 of the above patent, there is described a method of cascading or sequentially iterating the modulation of the sawtooth wave in order to increase the total phase shift possible in a single modulator. The extension of such cascading plainly permits, under particular circumstances, the lowering of the lowest modulation frequency involved to almost any practical value short of direct current. Cascading, however, has no effect on the upper limit of the modulating frequency. It is inherent in the basic mechanism of all modulating processes, that the highest modulating frequency cannot equal or exceed one half of the carrier frequency at the point of modulation. In a modulator of the Serrasoid type described in my earlier patent, internal interference within the modulation band is generated when the modulating frequency exceeds one third of the carrier frequency. As a practical matter, design practices have settled near an upper limit for the modulating frequency of one-fourth of the local carrier. The limit is caused by problems of filtering, and the like.

It is, accordingly, an object of this invention to provide a frequency modulating circuit wherein the modulating frequency may be raised above the upper frequency limit of one-fourth of the local carrier frequency.

Another object of this invention is to provide a frequency modulating circuit adaptable for multiplex telephone channels wherein the upper limit of the modulation band may be extended almost indefinitely.

The Serrasoid frequency modulation generator utilizes a system of sampling. Normally one sample of the modulating signal is sampled during each carrier cycle. It is thus another object of the invention to increase the number of samples per cycle of carrier frequency.

Other and further objects will become apparent upon reading the following specification together with the accompanying drawings forming a part thereof:

Referring to the drawings:

FIG. 1 is a block diagram of a circuit which embodies the features of this invention, and FIG. 2 is a block diagram of the phase modulator shown in FIG. 1.

Referring to FIG. 1, the frequency modulator comprises an oscillator 10 having a high degree of frequency stability which is designated by way of illustration as being controlled by a piezoelectric crystal. The output of the oscillator is a sinusoidal wave form as shown and is divided into three parallel branches, which are almost identical. Two of the branches include phase shifting networks 12, 14 which serve to shift the signal outputs of the oscillator 10 by 120° and 240°, respectively, to provide three phase shifted signals uniformly spaced in time. The three signals, i.e., the output of the crystal oscillator 10 and the outputs of the phase shifters 12, 14 are connected to passive sawtooth generators 18, 20 and 22 respectively, which generators modify the shape of the output waves to provide a sawtooth base wave. Each equally spaced wave is in turn applied to a respective phase modulator 24, 26 and 28. The modulating signals from a modulator input 30 are applied to an input circuit 32 which includes a corrector network arranged to convert the amplitude of the modulating potentials to such relative values that the phase modulators 24, 26, 28 will deliver a frequency modulated output. This corrector arrangement is known in the art and modifies the amplitudes of the modulating potentials so that the amplitudes of the various components are inversely proportional to their respective frequenices, thereby providing an output such that modulating potentials of equal amplitudes produce equal frequency deviations regardless of the frequency of the particular modulating potential.

The phase modulator circuits used herein are illustrated in detail in my above-identified patent and utilize the sawtooth voltage from the sawtooth generators to obtain a wide swing frequency modulated wave. As shown in FIG. 2, they include a square wave generator 50 connected to a pulse generator 52. Modulating potentials are applied to the square wave generator 50 of the phase modulator by means of a conductor which is connected to the cathode of a triode in square wave generator 50 through a blocking capacitor. The change in the potential of the cathode with respect to ground will cause a change in the point along the straight portion of the sawtooth wave at which the triode begins to conduct to form a rectangular wave. If the cathode is made more positive, conduction will begin later. If it is made more negative, conduction will begin earlier. Since the sawtooth is very accurately linear with respect to time, the advance or retardation of the instant at which the conduction begins will be a linear time function of the modulated voltage. The late beginning of conduction in response to a positive modulating potential narrows the resulting rectangular wave. Similarly, a negative modulating potential widens the wave. The various widths of the rectangular waves are thus the result of modulation signals. The rectangular waves are then differentiated in pulse generator 52 to produce a series of pulses and the resulting phase displacement of the pulses with respect to each other cause corresponding variations in the frequency of oscillations. Each pulse represents a sample of the modulating signal. There is one sample per sawtooth cycle. Since the sawtooth waveforms are phase displaced each samples the modulator signals at a different time. Effectively the three phased sawtooth waveforms produce conduction in the triodes of their respective square wave generator three different times during each cycle of carrier frequency and thus sample the modulator signal three times in every cycle of carrier frequency. The output pulses are preferably "cascaded" i.e., employed to generate a second sawtooth wave in the sawtooth generators 34, 36 and 38 which are duplicates of the circuits of sawtooth generators 18, 20 and 22. The second sawtooth waves generated in these duplicate circuits will be phase shifted to the extent of the modulating signal at the input of the sawtooth generator. Identical or independent modulation, in this case identical modulation produced by modulator input 32 to phase shift modulators 40, 42 and 44, gives rise to added advances or retardations of the eventual pulses appearing at the phase modulator outputs. In the case where the modulating voltages applied are identical, the resultant modulation will have been doubled. The circuit constants and tube electrode potentials within these circuits are adjusted to give similar wave shapes at corresponding points in the duplicte circuits. The non-linearities accompanying the second modulation are no greater than those accompanying the first and since the modulation has been doubled, the sum of the non-linearities of the iterated modulation is no greater a percentage of the total modulation than is the case for a single modulation. This duplication of circuits is generally referred to as cascading and may be extended indefinitely and is eventually limited only by matters of size and cost.

The resulting phase displacement of the pulses causes corresponding variations in a frequency filter 46 which is connected to the output of the modulators 40, 42 and 44. This results in the production of a wide swing frequency modulated wave. This frequency modulated wave may be multiplied in frequency in the usual manner to any desired extent so that it will have the desired frequency for radiation or other form of transmission. It should be noted, however, that the frequency deviations are multiplied in magnitude along with the center frequency so that the maximum deviation produced in the modulator should be a proper sub-multiple of the maximum deviation to be transmitted after multiplication.

It should be noted that three sawtooth waves are formed twice, and three resulting pulse trains from the modulator result at the outputs of phase modulators 40, 42 and 44. Each pulse train represents one sample of the modulator signal for every sawtooth cycle. Thus there are a total of three samples per sawtooth cycle. The sawtooth waves overlap in time, but the individual output pulses, provided they are short enough, do not overlap. The outputs of the phase modulators 40, 42 and 44, (i.e. the three samples of modulator signal) are connected through a single filter 46 to a common anode supply for the phase modulators. At the driving point of the filter, there exists a virtual "carrier" source of three times the original carrier frequency. This is true because, as stated above, the individual pulses are short enough to be considered entirely independent and as far as the filter is concerned, the only important factor is the pulse repetition frequency, since this defines the fundamental component of the complex wave. The output of the filter is to a conventional frequency multiplier 48.

Since the virtual carrier has a frequency higher than the frequency of oscillator 10, the filter 46 is tuned to a band-pass center frequency corresponding to the virtual "carrier" frequency. This, of course, may require a reduction in the total frequency multiplication for output at a predetermined frequency. This may limit the low modulation frequency phase shift. However, this apparent loss of multiplication is compensated for by cascading within each branch to a suitable extent, such as once, whereby the phase shift of each pulse is doubled. It should be noted that, although the number of output pulses per second have been increased and therefore the apparent period of the pulse train has been decreased, the individual sawtooth cycles are of the same duration and are, therefore, capable of producing the same maximum phase shift, measured in units of time (which is the definitive unit) as a "Serrasoid" of but a single branch. It should, of course, be noted that the output of the modulator input corrector includes some conventional means to prevent intermodulation between the various phase modulators.

The upper frequency limits of a frequency modulation device may be viewed as existing due to the existence of too few samples of the complex modulating signal per cycle of carrier frequency. The Serrasoid is inherently a sampling device. In its simple form, which includes only one branch and no cascading, it effectively takes a sample once per carrier signal period of the modulating wave and produces a pulse whose position, i.e., phase, is linearly related to the instantaneous amplitude of the modulating signal. When the modulating frequency exceeds one-half the carrier frequency, the mechanism is no longer able to define the highest frequency components of the modulation, because at least two samples per modulation component period are required for such definition. It is evident that by the circuit of the drawing, and with the single qualification that the separate pulse trains at the point where they are brought together again shall be independent and not interact, there has been obtained a means for increasing the number of samples per carrier signal period and, hence, the number of samples of the modulating signal. In the conventional Serrasoid, which is described in my Patent 2,566,826, if an attempt is made to accommodate higher modulation frequencies by raising the carrier frequencies, the sawtooth period is shortened and the lower limits on modulation frequency are raised proportionately. In accordance with the invention, the high frequency limit of the modulating signal is raised without serious practical limit and without raising the low frequency limit. It should be noted that in the individual branches, of which there may be any number, the amount of cascading may be increased to further increase the total possible phase shift. It would be normal practice to treat the relationship between the highest modulating frequency and the new virtual "carrier" frequency in the customary way, i.e., by limiting the modulating frequency to one-fourth of the virtual "carrier" frequency.

A practical illustration of the advantages of the circuit of this invention follows. A hypothetical transmitter has a predetermined intermediate carrier frequency of 72 megacycles. This carrier is heterodyned in the usual way to the final carrier frequency. The hypothetical transmitter requires the transmission of approximately 250 multiplex telephone channels, using the usual multiplexing allocation of 4 kilocycles per channel. The upper limit of the modulation band is approximately 1000 kilocycles. In the hypothetical transmitter, the final deviations require a minimum multiplication of twelve times so that the local carrier frequency of a Serrasoid within the transmitter must be $\frac{1}{12}$ of 72 or 6 megacycles, and the sawtooth cycles are therefore somewhat less than one-sixth of a microsecond in duration. The highest modulating frequency in a conventional transmitter under these circumstances would be approximately 1500 kilocycles (i.e. one-fourth of 6 megacycles) and still yield four samples per cycle. If such a transmitter were now required to transmit 600 multiplex channels with a modulation band extending to approximately 2500 kilocycles without altering the basic plan of the transmitter, a simple conventional Serrasoid could not accomplish the desired result.

In accordance with the invention, two Serrasoid branches could be utilized to produce 12,000,000 pulses per second at virtual local carrier frequency or virtual carrier frequency of 12 megacycles. This permits four samples or more per second at modulation frequencies of up to 3,000 kilocycles without a disadvantageous reduction in the length of the individual sawtooth cycles, which would lower the maximum permissible phase shift in the modulators. Since the virtual frequency is 12 megacycles, and for a 72 megacycle carrier output a multiplication of twelve times is not possible, it is necessary to produce the desired final deviation by other means. This is provided by cascading each branch once to give an effective total multiplication of twelve.

It will be noted that the amount of cascading and the amount of branching may be extended indefinitely to produce these unique results.

I have described what I believe to be the best embodiment of my invention. I do not wish, however, to be confined to the embodiment shown, but what I desire to cover by Letters Patent is set forth in the appended claims.

I claim:

1. A generator of frequency modulated signals comprising in combination: a source having separate outputs to provide a plurality of first sawtooth wave generators for generating a plurality of continuous sawtooth waves each time interlaced with the others and of substantially constant frequency, each cycle of said plurality of waves being shaped to include an extended portion of accurate linearity, a source of modulatin potential, a plurality of first wave shape modifying means each connected to said source of modulating potential and to a sawtooth wave generator output to convert a respective one of the sawtooth waves into a succession of pulses whose time spacing varies in accordance with the instantaneous magnitude of the modulating potential so that each pulse occurs when said instantaneous magnitude of said modulating potential has a predetermined relation to the sawtooth wave, a plurality of second sawtooth wave generators each connected to said first wave shape modifying means to produce a plurality of interlaced sawtooth waves of substantially constant frequency and phase spaced with respect to each other in accordance with the time spacing of the pulses emitted by said first wave shape modifying means; a plurality of second wave shape modifying means each connected to said source of modulating potential and to a second sawtooth generator to convert the sawtooth waves from each of said second sawtooth wave generators, respectively, into a succession of pulses whose time spacing varies in accordance with the instantaneous magnitude of the modulating potentials; a resonant circuit connected to each of said second wave shape modifying means and disposed to be activated by all the pulses from said wave shape modfying means for producing a frequency modulated wave.

2. A generator as in claim 1 including a corrector network interposed between the source of modulating potentials and each of said wave shape modifying means for attenuating the components of the modulating potentials in proportion to their frequencies.

3. A generator of frequency modulated waves comprising a plurality of first sawtooth wave generators for generating sawtooth waves wherein each cycle has an extended portion of accurate linearity, a source of modulating potential, first means connected to said source of modulating potential and said sawtooth wave generators for originating a pulse during the accurately linear portion of each of said sawtooth waves upon the occurrence of said modulating potential reaching a predetermined magnitude in relation to the instantaneous voltage of the sawtooth waves, second sawtooth wave generators for generating further sawtooth waves in response to each of said pulses, second means connected to said source of modulating potential and to said second sawtooth wave generators for originating further pulses during the accurately linear portion of each further sawtooth wave upon the occurrence of said predetermined modulating potential, and means for deriving damped sinusoidal oscillations from the combination of said further pulses.

References Cited in the file of this patent

UNITED STATES PATENTS

| | | |
|---|---|---|
| 2,566,826 | Day | Sept. 4, 1951 |
| 2,605,360 | Trevor | July 29, 1952 |
| 2,784,255 | Earp | Mar. 5, 1957 |